(12) United States Patent
Suzuki

(10) Patent No.: US 12,320,986 B2
(45) Date of Patent: Jun. 3, 2025

(54) DISPLAY APPARATUS

(71) Applicant: CANON KABUSHIKI KAISHA, Tokyo (JP)

(72) Inventor: Kyouhei Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 18/295,367

(22) Filed: Apr. 4, 2023

(65) Prior Publication Data

US 2023/0333395 A1  Oct. 19, 2023

(30) Foreign Application Priority Data

Apr. 13, 2022 (JP) ................ 2022-066067

(51) Int. Cl.
*G02B 27/01* (2006.01)
*H05K 7/02* (2006.01)
*H05K 7/04* (2006.01)

(52) U.S. Cl.
CPC .. *G02B 27/0176* (2013.01); *G02B 2027/0159* (2013.01)

(58) Field of Classification Search
CPC ........ G02B 2027/0159; G02B 27/0176; G02B 27/02; G02B 27/01; H05K 7/02; H05K 7/04
USPC ....................................................... 361/807
See application file for complete search history.

(56) References Cited

U.S. PATENT DOCUMENTS

| 11,353,711 | B1* | 6/2022 | Freeman ................ G09G 3/007 |
| 11,723,163 | B1* | 8/2023 | Cavallaro ............ G06F 1/1637 |
| | | | 361/807 |
| 11,871,674 | B1* | 1/2024 | Smyth .................... G02B 1/115 |
| 2013/0214998 | A1* | 8/2013 | Andes ................ G02B 27/0172 |
| | | | 345/8 |
| 2014/0333773 | A1* | 11/2014 | Davis ..................... H04N 23/51 |
| | | | 348/158 |
| 2019/0101866 | A1* | 4/2019 | Georgiou ........... G02B 27/0172 |
| 2019/0243123 | A1* | 8/2019 | Bohn ..................... G02B 6/122 |
| 2020/0252707 | A1* | 8/2020 | Won ....................... H04R 9/025 |
| 2020/0260168 | A1* | 8/2020 | Masuda ................ H04R 1/028 |
| 2022/0124188 | A1* | 4/2022 | Song ..................... G06F 1/1652 |
| 2022/0326730 | A1* | 10/2022 | Ashida .................. G02B 27/02 |

(Continued)

FOREIGN PATENT DOCUMENTS

JP  2021-139988 A  9/2021

*Primary Examiner* — Timothy J Thompson
*Assistant Examiner* — Guillermo J Egoavil
(74) *Attorney, Agent, or Firm* — Cowan, Liebowitz & Latman, P.C.

(57) ABSTRACT

A display apparatus is attachable to a user. The display apparatus includes a display, a substrate connected to the display and bendable, and an actuator configured to generate a driving force to move the display in a first direction that intersects a display surface of the display. The actuator is disposed at a position shifted from the display in a second direction different from the first direction. The substrate is fixed at a position closer in the second direction to a surface of the display on a side where the actuator is located than to a surface of the display on a side where the actuator is not located. The substrate extends in the second direction from a connected portion of the substrate connected to the display toward the side where the actuator is located.

11 Claims, 4 Drawing Sheets

(56) References Cited

U.S. PATENT DOCUMENTS

2023/0031160 A1* 2/2023 Nashida ............. H04N 21/4668
2024/0377645 A1* 11/2024 Melville ............. G02B 26/101

* cited by examiner ved through the lens 103.

DISPLAY APPARATUS

BACKGROUND

Technical Field

One of the aspects of the disclosure relates to a display apparatus.

Description of Related Art

In moving an electrical component relative to a rigid substrate mounted with a control substrate configured to control the electrical component, one conventional structure changes a bending state of a flexible printed circuit substrate connected to the electrical component and the rigid substrate. Japanese Patent Laid-Open No. (JP) 2021-139988 discloses a structure configured to reduce a load that is generated by the elasticity of the flexible printed circuit substrate and prevents the electrical component from moving in a case where the bending state of the flexible printed circuit substrate changes.

However, the structure disclosed in JP 2021-139988 bends the flexible printed circuit substrate multiple times, and thus a system using the structure disclosed in JP 2021-139988 may become large.

SUMMARY

One of the aspects of the present disclosure provides a compact display apparatus that can reduce a load that is generated by bending a flexible printed circuit substrate and prevents an electrical component from moving.

A display apparatus according to one aspect of the disclosure is attachable to a user. The display apparatus includes a display, a substrate connected to the display and bendable, and an actuator configured to generate a driving force to move the display in a first direction that intersects a display surface of the display. The actuator is disposed at a position shifted from the display in a second direction different from the first direction. The substrate is fixed at a position closer in the second direction to a surface of the display on a side where the actuator is located than to a surface of the display on a side where the actuator is not located. The substrate extends in the second direction from a connected portion of the substrate connected to the display toward the side where the actuator is located.

Further features of the disclosure will become apparent from the following description of embodiments with reference to the attached drawings.

DESCRIPTION OF THE EMBODIMENTS

Figure 1:
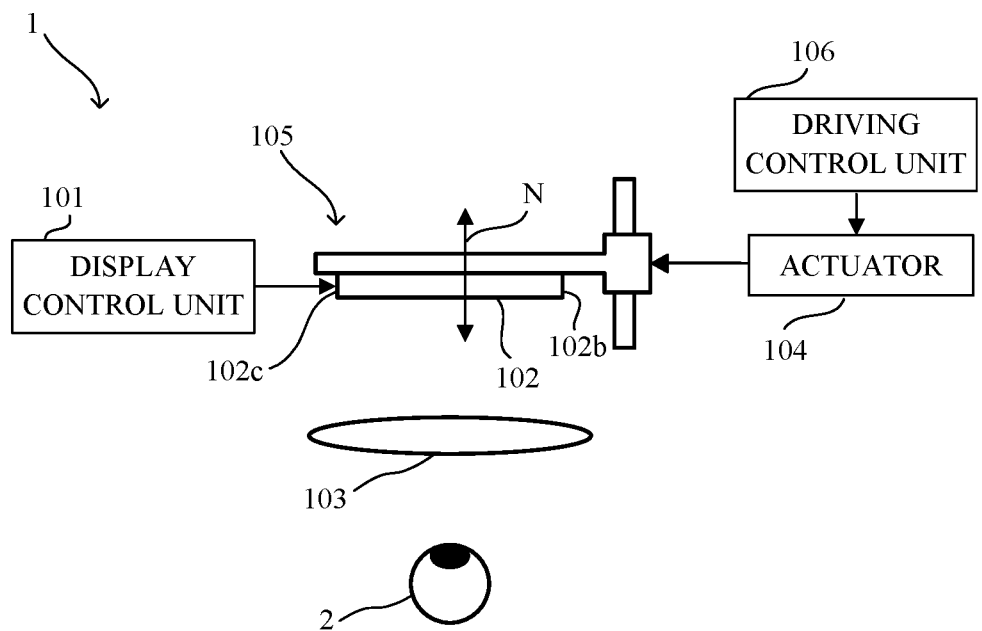
FIG. 1 illustrates a schematic configuration of an image display apparatus that includes a driving apparatus according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

A description will be given of a driving apparatus according to the embodiment of the disclosure for diopter changing driving in an image display apparatus, but the disclosure is applicable to driving for other apparatuses.

FIG. 1 illustrates a schematic configuration of an image display apparatus 1 that includes a driving apparatus according to one embodiment of the disclosure. The image display apparatus 1 is used, for example, for Augmented Reality (AR) devices, Mixed Reality (MR) devices, and Virtual Reality (VR) devices. The image display apparatus 1 has a type attachable to the head of the user (head mount type) and a type wearable by the user like eyeglasses (glasses type). In any form, the image display apparatus 1 is fixed near an eye 2 of the user so that the display unit or lens faces the eye 2 of the user.

The image display apparatus 1 includes a display control unit 101, a display unit (display) 102, a lens (optical element) 103, an actuator (driving unit) 104, a movable unit 105, and a driving control unit 106. In this embodiment, a rectangular parallelepiped electrical component included in the display unit 102, which will be described below, the actuator 104, and a flexible printed circuit substrate, which will be described below, having a first end connected to the electric component and a second end connected to the actuator 104 constitute a driving apparatus. The display unit 102 is held by the movable unit 105 and can display still and moving images according to instructions from the display control unit 101 which is an integrated circuit substrate. The lens 103 is disposed at a position facing the top surface of the electrical component included in the display unit 102. An image displayed on the display surface (or display plane) of the display unit 102 (the top surface of the electrical component) is presented to the eye 2 through the lens 103. The actuator 104 moves the movable unit 105 along a normal direction N of the top surface, which is an example of a direction intersecting the display surface of the display unit 102, according to the instruction of the driving control unit 106. As the movable unit 105 moves, the display unit 102 held by the movable unit 105 also moves along the normal direction N. Moving the display unit 102 can change the diopter where the display surface of the display unit 102 is observed through the lens 103.

FIG. 1 illustrates a structure that provides display to a single eye of the user, but adding another structure can provide displays for both eyes of the user.

Figures 2A, 2B:
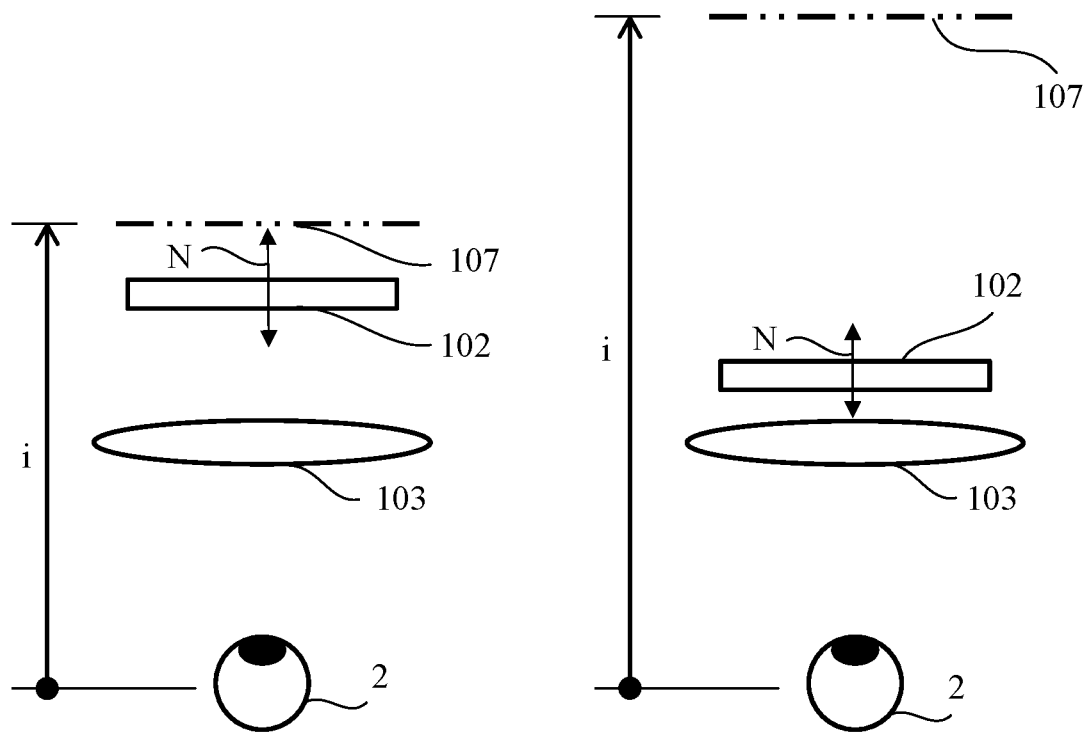
FIGS. 2A and 2B illustrate states of a display unit and a lens in a case where the display unit is moved.

FIGS. 2A and 2B illustrate the states of the display unit 102 and the lens 103 in a case where the display unit 102 is moved. FIG. 2A illustrates the state in a case where the display unit 102 is moved away from the lens 103. FIG. 2B illustrates a state in a case where the display unit 102 is moved in a direction approaching the lens 103. The user visually recognizes a virtual image 107 in observing the display surface of the display unit 102 through the lens 103 with the eye 2. In this embodiment, the position of the virtual image 107 in the normal direction N based on the position of the eye 2 is defined as a virtual imaging position i.

As illustrated in FIGS. 2A and 2B, as the display unit 102 moves, the virtual imaging position i also moves. For example, as the display unit 102 approaches the lens 103, the virtual imaging position i moves away from the eye 2. As the display unit 102 moves away from the lens 103, the virtual imaging position i approaches the eye 2. Therefore, as described above, the diopter can be changed by moving the display unit 102.

In this embodiment, the virtual imaging position i moves away from the eye 2 as the display unit 102 approaches the lens 103, and the virtual imaging position i approaches the eye 2 as the display unit 102 moves away from the lens 103. However, the disclosure is not limited to this embodiment. The virtual imaging position i may approaches the eye 2 as the display unit 102 approaches the lens 103, and the virtual imaging position i may move away from the eye 2 as the display unit 102 moves away from the lens 103.

Figure 3:
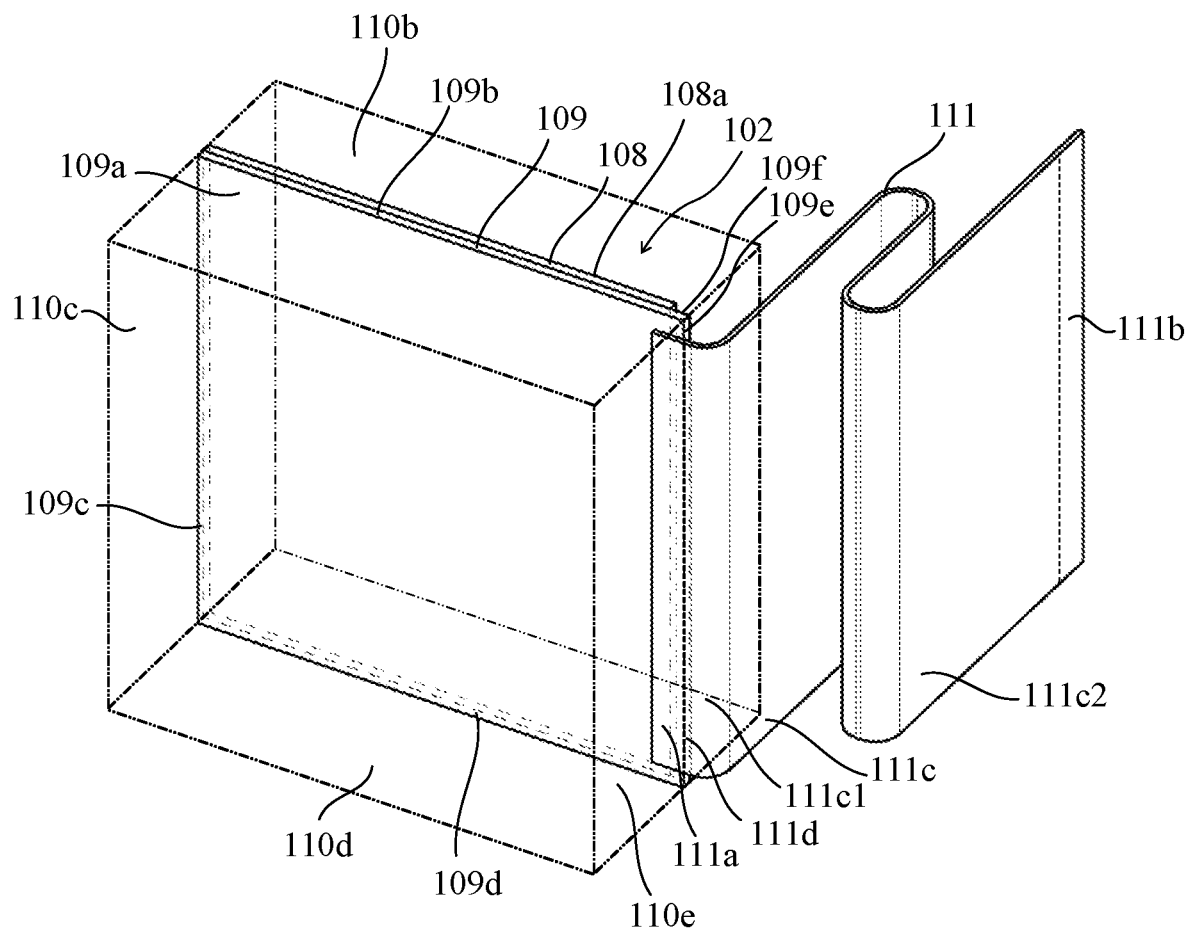
FIG. 3 is a perspective view illustrating the structure of the display unit.

FIG. 3 is a perspective view illustrating the structure of the display unit 102. The display unit 102 includes a backlight unit 108 that serves as a light source for display, and a liquid crystal panel (electrical component) 109 that can obtain a desired display by switching transmission and shielding of light emitted from the backlight unit 108. The backlight unit 108 and the liquid crystal panel 109 are fixed with an adhesive or the like.

The liquid crystal panel 109 includes a top surface (first surface) 109a that can display still and moving images, four side surfaces 109b, 109c, 109d, and 109e adjacent to the top surface 109a, and a bottom surface (second surface) 109f opposite to the top surface 109a. In this embodiment, the side surface 109b is located on the top side, the side surface 109c is located on the left side, the side surface 109d is located on the bottom side, and the side surface 109e is located on the right side. A transparent cover glass for protecting the liquid crystal panel 109 may be fixed to the top surface 109a by a method such as an adhesive agent. The four side surfaces 109b, 109c, 109d, and 109e are included in surfaces 110b, 110c, 110d, and 110e, respectively. As long as the surfaces 110b, 110c, 110d, and 110e include the side surfaces 109b, 109c, 109d, and 109e, respectively, their sizes are not limited to those illustrated in FIG. 3. The backlight unit 108 is fixed to the bottom surface 109f.

A flexible printed circuit substrate 111 is bendable. The flexible printed circuit substrate 111 has a connected portion 111a connected to the liquid crystal panel 109. The liquid crystal panel 109 and flexible printed circuit substrate 111 are electrically connected via a conductive adhesive or the like. Therefore, an electric signal such as an instruction for switching between light transmission and light shielding performed by the liquid crystal panel 109 can be transmitted to the liquid crystal panel 109 via the flexible printed circuit substrate 111.

Although the connected portion 111a is connected to the liquid crystal panel 109 on the top surface 109a in FIG. 3, the disclosure is not limited to this example. For example, the connected portion 111a may be connected to the liquid crystal panel 109 via the bottom surface 109f. The flexible printed circuit substrate 111 may also be connected to the backlight unit 108.

In this embodiment, the display unit 102 includes the backlight unit 108 and the liquid crystal panel 109, but the disclosure is not limited to this example. For example, the display unit 102 may include an organic EL display or the like in which an organic EL material is formed on a substrate. In that case, the flexible printed circuit substrate 111 is connected to one of the top surface and the bottom surface of the substrate (electrical component) of the organic EL display.

In this embodiment, the electrical component is a component included in the display unit 102, but the disclosure is not limited to this example. For example, the electrical component may be an image sensor or the like. In this case the flexible printed circuit substrate is connected to the image sensor through the bottom side of the image sensor.

In this embodiment, the flexible printed circuit substrate 111 is connected to the electrical component so as to cover part of a predetermined surface of the electrical component, but the disclosure is not limited to this example. For example, the flexible printed circuit substrate 111 may be connected to the electrical component so as to cover the entire predetermined surface of the electrical component.

Figure 4:
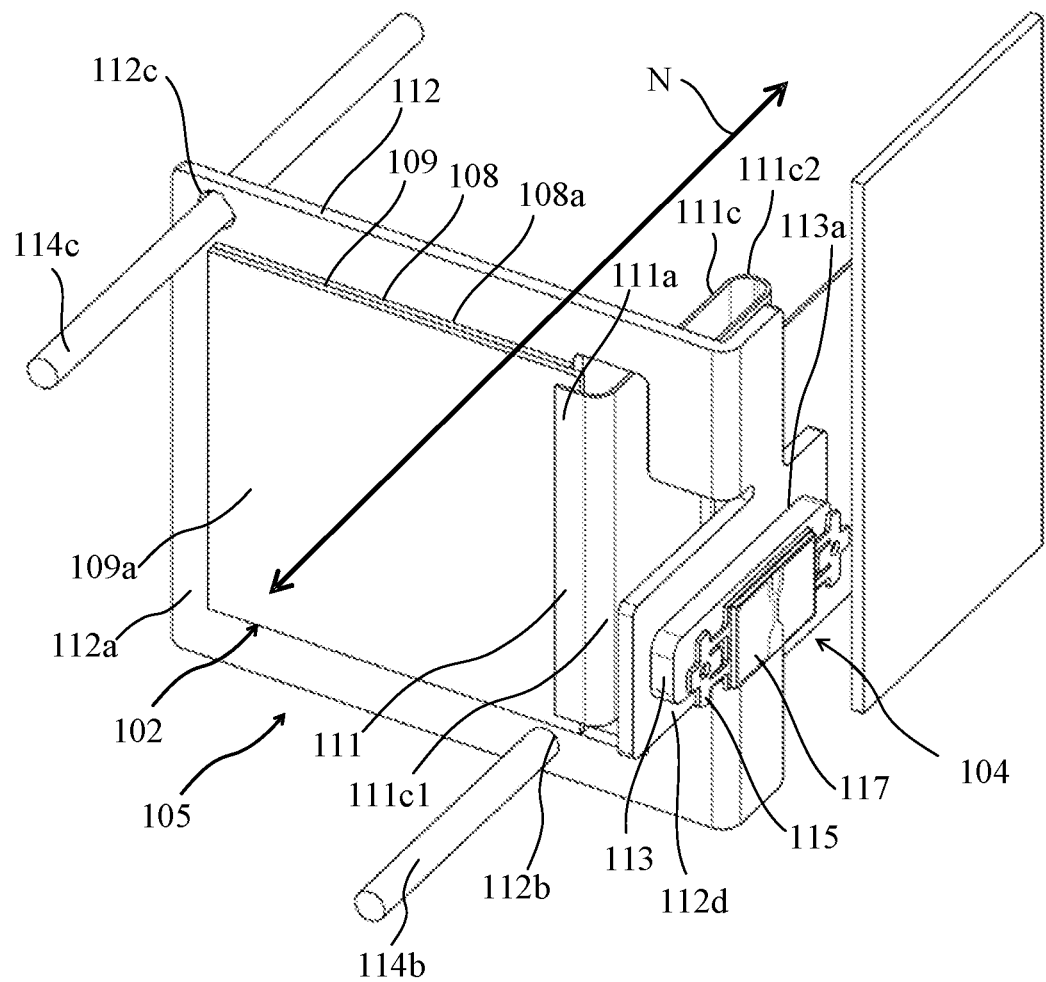
FIG. 4 is a perspective view illustrating the structure around a movable unit.
Figure 5:
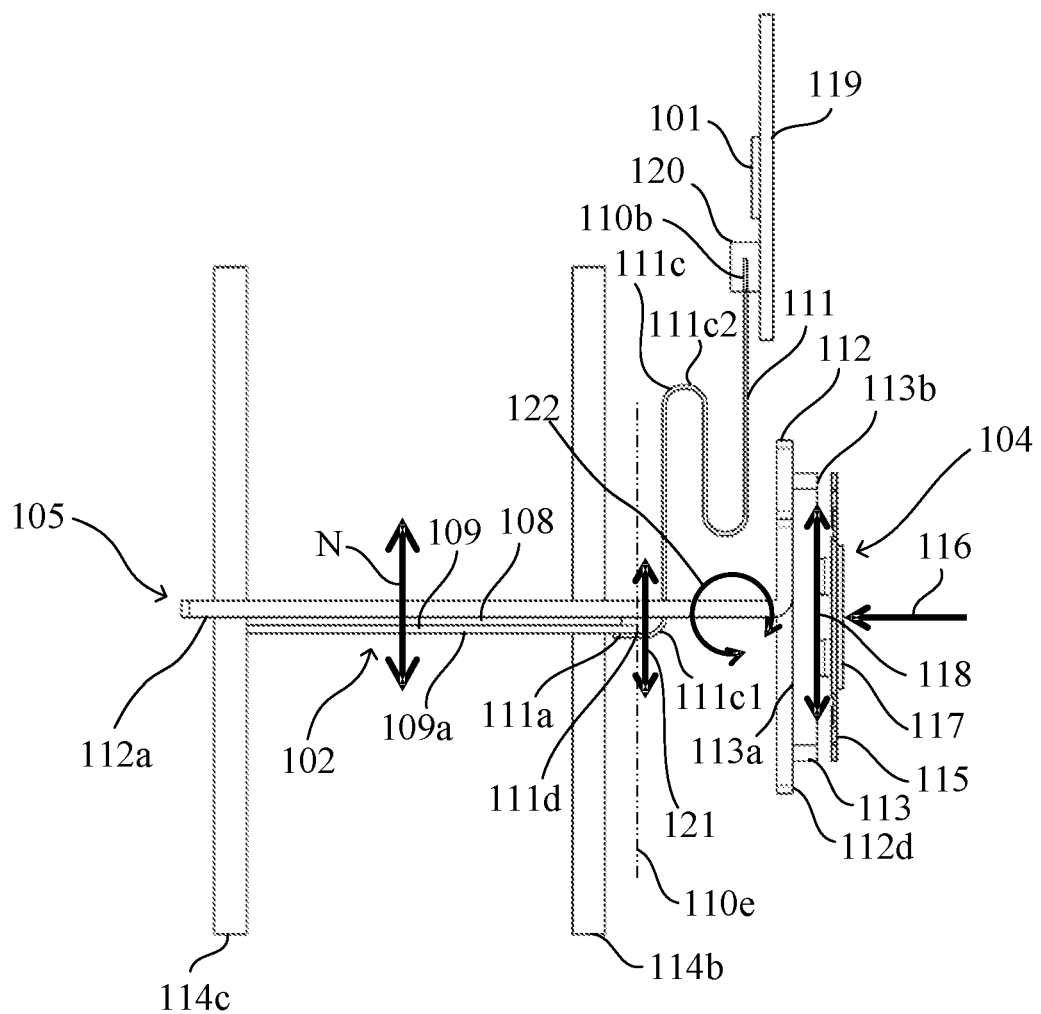
FIG. 5 is a top view illustrating the structure around the movable unit.

FIGS. 4 and 5 are a perspective view and a top view, respectively, illustrating the structure around the movable unit 105 that holds the display unit 102. The movable unit 105 includes a movable sheet metal 112 and a friction member 113. The actuator 104 includes a vibration plate 115 and a piezoelectric element 117 and is disposed at a position that laterally shifts from that of the display unit 102.

The display unit 102 is fixed to the movable sheet metal 112 by attaching a bottom surface 108a of the backlight unit 108 to an attachment surface 112a of the movable sheet metal 112 with an adhesive, double-sided tape, or the like.

The movable sheet metal 112 has a first guide hole 112b and a second guide hole 112c. A first guide member 114b and a second guide member 114c are engaged with (fitted into) the first guide hole 112b and the second guide hole 112c, respectively. The first guide member 114b and the second guide member 114c are fixed to an unillustrated housing and cannot move relative to the housing. The first guide hole 112b is a round hole engaged with the first guide member 114b, and restricts translational movement of the movable unit 105 in a plane parallel to the top surface 109a of the liquid crystal panel 109. The second guide hole 112c is engaged with the second guide member 114c and restricts rotational movement of the movable unit 105 around the first guide hole 112b. Due to this structure, the movable unit 105 can move only along the normal direction N relative to the unillustrated housing.

The friction member 113 is fixed to the movable sheet metal 112 by attaching a pasted surface 113a of the friction member 113 to a pasted surface 112d of the movable sheet metal 112 with an adhesive, double-sided tape, or the like. A friction contact surface 113b of the friction member 113 is brought into frictional contact with the vibration plate 115 by a compression force (biasing force) 116 applied by a biasing member such as a compression spring.

The piezoelectric element 117 is attached to the vibration plate 115 with an adhesive or the like. In a case where an ultrasonic signal is applied to the piezoelectric element 117, ultrasonic vibration is generated in the piezoelectric element 117. At this time, ultrasonic vibration is also generated in the vibration plate 115, and a driving force 118 is generated. The driving force 118 is transmitted to the friction member 113, which is in frictional contact with two protrusions provided on the vibration plate 115, via frictional force. Thereby, the friction member 113 can move along the normal direction N.

The driving control unit 106 can change a moving direction and speed of the friction member 113 by changing the magnitude, frequency, phase difference, etc. of the ultrasonic signal applied to the piezoelectric element 117.

As the friction member 113 moves due to the ultrasonic vibration generated in the vibration plate 115, the display unit 102 held by the movable unit 105 also moves along the normal direction N.

Since the friction member 113 always frictionally contacts the vibration plate 115 by the compression force 116, the actuator 104 can hold the friction member 113 even in a case where the piezoelectric element 117 is not energized (electrified) and no ultrasonic signal is applied. Therefore, even in a case where the piezoelectric element 117 is not energized, the movable unit 105 does not move, and thus so a component can be prevented from getting damaged due to the movement of the movable unit 105.

A rigid substrate 119 is fixed to an unillustrated housing. The display control unit 101 and a connector 120 are mounted on the rigid substrate 119. The connector 120 is connected to the display control unit 101 inside the rigid substrate 119. A fixed portion 111b of the flexible printed circuit substrate 111 is inserted into the connector 120, which is indicated by a dotted line in FIG. 5. Inserting the fixed portion 111b into the connector 120 can electrically connect the display control unit 101 and the display unit 102. Thereby, in this embodiment, the liquid crystal panel 109 can switch between the light transmission and light shielding in accordance with the control signal output from the display control unit 101. As a result, various displays based on the control of the display control unit 101 can be displayed on the display unit 102.

Since the fixed portion 111b is inserted into the connector 120 mounted on the rigid substrate 119 fixed to the unillustrated housing, it does not move in a case where the display unit 102 is moved. That is, the fixed portion 111b is fixed to a member whose distance from the display unit 102 changes as the display unit 102 moves. In this embodiment, the fixed portion 111b is fixed to the housing because it is inserted into the connector 120, but the disclosure is not limited to this example. For example, the fixed portion 111b may be attached to the housing with double-sided tape and fixed to the housing.

The flexible printed circuit substrate 111 includes a linking portion 111c configured to link the connected portion 111a and the fixed portion 111b. In the flexible printed circuit substrate 111, the fixed portion 111b is fixed to the connector 120 of the rigid substrate 119 fixed to the housing, and the connected portion 111a is fixed to the display unit 102 that is movable relative to the housing. Due to this structure, as the display unit 102 moves, the linking portion 111c deforms. Since the flexible printed circuit substrate 111 has elasticity to return to its original shape, an elastic force 121 is always generated around the connected portion 111a. The magnitude of the elastic force 121 changes according to the deformed state of the flexible printed circuit substrate 111. Therefore, in a case where the deformed state of the linking portion 111c changes due to the movement of the display unit 102, the elastic force 121 also changes.

A rotational moment 122 is generated by the driving force 118 generated by the actuator 104 and the elastic force 121 generated by the flexible printed circuit substrate 111. As the rotational moment 122 increases, the frictional load increases, which is generated in a case where the guide hole provided in the movable sheet metal 112 and the guide member slide in moving the movable unit 105. In addition, the movable unit 105 is more likely to tilt. In a case where the frictional load becomes large, the electric power necessary to move the movable unit 105 becomes large and thus the frictional load may be suppressed. In a case where the movable unit 105 tilts, the display unit 102 and the virtual image 107 also tilt and desired display cannot be performed. Therefore, the rotational moment 122 may be reduced.

In this embodiment, the linking portion 111c includes a component side-surface passing portion 111d that passes through the surface 110e closest to the actuator 104 among the four surfaces 110b, 110c, 110d, and 110e. As illustrated in FIGS. 1 and 5, the flexible printed circuit substrate 111 is fixed at a position closer in the horizontal direction of the display unit 102 to a (side) surface 102b of the display unit 102 on a side where the actuator 104 is located than to a (side) surface 102c of the display unit 102 on a side where the actuator 104 is not located. The flexible printed circuit substrate 111 extends from the connected portion 111a toward the side where the actuator 104 is located in the horizontal direction of the display unit 102. This structure can make the driving force 118 and the elastic force 121 close to each other and reduce the rotational moment 122.

If the frictional load significantly fluctuates, the controllability of the actuator 104 to move the movable unit 105 deteriorates. As described above, providing the component side-surface passing portion 111d passing through the surface 110e closest to the actuator 104 in the linking portion 111c can make the driving force 118 and the elastic force 121 close to each other. Therefore, even in a case where the elastic force 121 significantly fluctuates, the fluctuation of the rotational moment 122 can be suppressed.

The linking portion 111c includes a bent portion 111c1 and an extra length absorbing portion 111c2. The bent portion 111c1 is bent. The extra length absorbing portion 111c2 deforms to absorb a change in a necessary length of the flexible printed circuit substrate 111 in a case where the movable unit 105 moves and the distance between the connected portion 111a and the fixed portion 111b changes. That is, in the flexible printed circuit substrate 111, both ends of a portion extending in the normal direction N are bent, and the length of the portion extending in the normal direction N of the linking portion 111c changes according to the position of the display unit 102 in the normal direction N.

While the extra length absorbing portion 111c2 has an S shape in this embodiment, the disclosure is not limited to this example. The extra length absorbing portion 111c2 may have any shape as long as it can absorb a change in the necessary length of the flexible printed circuit substrate 111, and may have, for example, a W shape.

The compression force 116 acts in a direction orthogonal to the driving direction by the actuator 104 parallel to the normal direction N. If a force in a direction parallel to the direction of the compression force 116 were to act, the biasing force generated between the friction member 113 and the vibration plate 115 due to the compression force 116 would become unstable. In addition, the driving force 118 generated by the ultrasonic signal applied to the piezoelectric element 117 also would become unstable. As a consequence, driving of the movable unit 105 by the actuator 104 would become unstable. Therefore, the force may not be applied in the direction parallel to the direction of the compression force 116. In this embodiment, the bent portion 111c1, the extra length absorbing portion 111c2, and the fixed portion 111b are arranged in this order from the connected portion 111a side in the driving direction of the actuator 104. Thereby, the elastic force 121 generated by the flexible printed circuit substrate 111 acts in the direction parallel to the driving direction of the actuator 104. Hence, the elastic force 121 acts in the direction orthogonal to the direction of the compression force 116, and thus the biasing force generated between the friction member 113 and the vibration plate 115 becomes stable. As a result, driving of the movable unit 105 by the actuator 104 can become stable.

The orthogonal direction and parallel direction are not limited to strictly orthogonal directions and parallel directions, respectively, and may be a substantially orthogonal direction (approximately orthogonal direction) and substantially parallel direction (approximately parallel direction), respectively.

The force acting in the direction orthogonal to the driving direction of the actuator 104 need not be the compression force 116. For example, the actuator 104 and the movable unit 105 may be connected by a rack or the like, and the biasing force acting for the rack connection may be the force acting in the direction orthogonal to the driving direction of the actuator 104.

The actuator 104 may generate a frictional force in the direction parallel to the direction of the elastic force 121 so as to hold the movable unit 105 by the friction even in a case where the piezoelectric element 117 is not energized. In a case where the piezoelectric element 117 is not energized, a frictional force is generated between the friction member 113 and the vibration plate 115 at the same position as that where the driving force 118 is generated. Without the frictional force, the elastic force 121 causes the movable unit 105 to move while the piezoelectric element 117 is not energized. The movement of the movable unit 105 can be suppressed by causing the actuator 104 to generate the frictional force in the direction parallel to the direction of the elastic force 121. In a case where the movement of the movable unit 105 is unnecessary, the application of the ultrasonic vibration to the piezoelectric element 117 can be stopped and the piezoelectric element 117 can be brought into the non-energized state, so that the image display apparatus 1 can save energy.

As described above, the structure according to this embodiment can reduce the load that is caused by the bending of the flexible printed circuit substrate 111 and prevents the electrical component from moving. Moreover, this embodiment can realize a compact driving apparatus. Applying this driving apparatus to the image display apparatus 1 that can change the diopter for viewing the display unit 102 can provide stable diopter changing operation and excellent visuality.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-066067, filed on Apr. 13, 2022, which is hereby incorporated by reference herein in its entirety.

What is claimed is:

1. A display apparatus attachable to a user, the display apparatus comprising:
   a display;
   a substrate connected to the display and bendable; and
   an actuator configured to generate a driving force to move the display in a first direction that intersects a display surface of the display,
   wherein the actuator is disposed at a position shifted from the display in a second direction different from the first direction,
   wherein the substrate is fixed at a position closer in the second direction to a surface of the display on a side where the actuator is located than to a surface of the display on a side where the actuator is not located, and
   wherein the substrate extends in the second direction from a connected portion of the substrate connected to the display toward the side where the actuator is located.

2. The display apparatus according to claim 1, wherein the substrate includes the connected portion, a fixed portion fixed to a member whose distance from the display changes in a case where the display is moved, and a linking portion configured to link the connected portion and the fixed portion.

3. The display apparatus according to claim 2, wherein the linking portion is bent at a position between the display and the actuator in the second direction.

4. The display apparatus according to claim 3, wherein the linking portion is bent between a portion extending from the connected portion in the second direction and a portion extending in the first direction.

5. The display apparatus according to claim 4, wherein both ends of the portion extending in the first direction are bent in the linking portion, and
   wherein a length of the portion of the linking portion extending in the first direction changes according to a position of the display in the first direction.

6. The display apparatus according to claim 2, wherein the linking portion deforms according to a position of the display in the first direction.

7. The display apparatus of claim 1, further comprising:
   a movable unit configured to hold the display and connected to the actuator, and
   a guide member engaged with a hole provided in the movable unit and configured to guide movement of the movable unit in the first direction.

8. The display apparatus according to claim 1, wherein the first direction is a normal direction of the display.

9. The display apparatus according to claim 1, wherein the second direction is a horizontal direction of the display apparatus.

10. The display apparatus according to claim 1, further comprising an optical element disposed at a position facing the display surface of the display apparatus,
    wherein the display apparatus adjusts diopter in a case where the display surface is observed through the optical element by moving the display in the first direction.

11. The display apparatus of claim 10, wherein the display apparatus is attachable to the user such that the optical element is disposed opposite to an eye of the user.

* * * * *